Patented Feb. 7, 1950

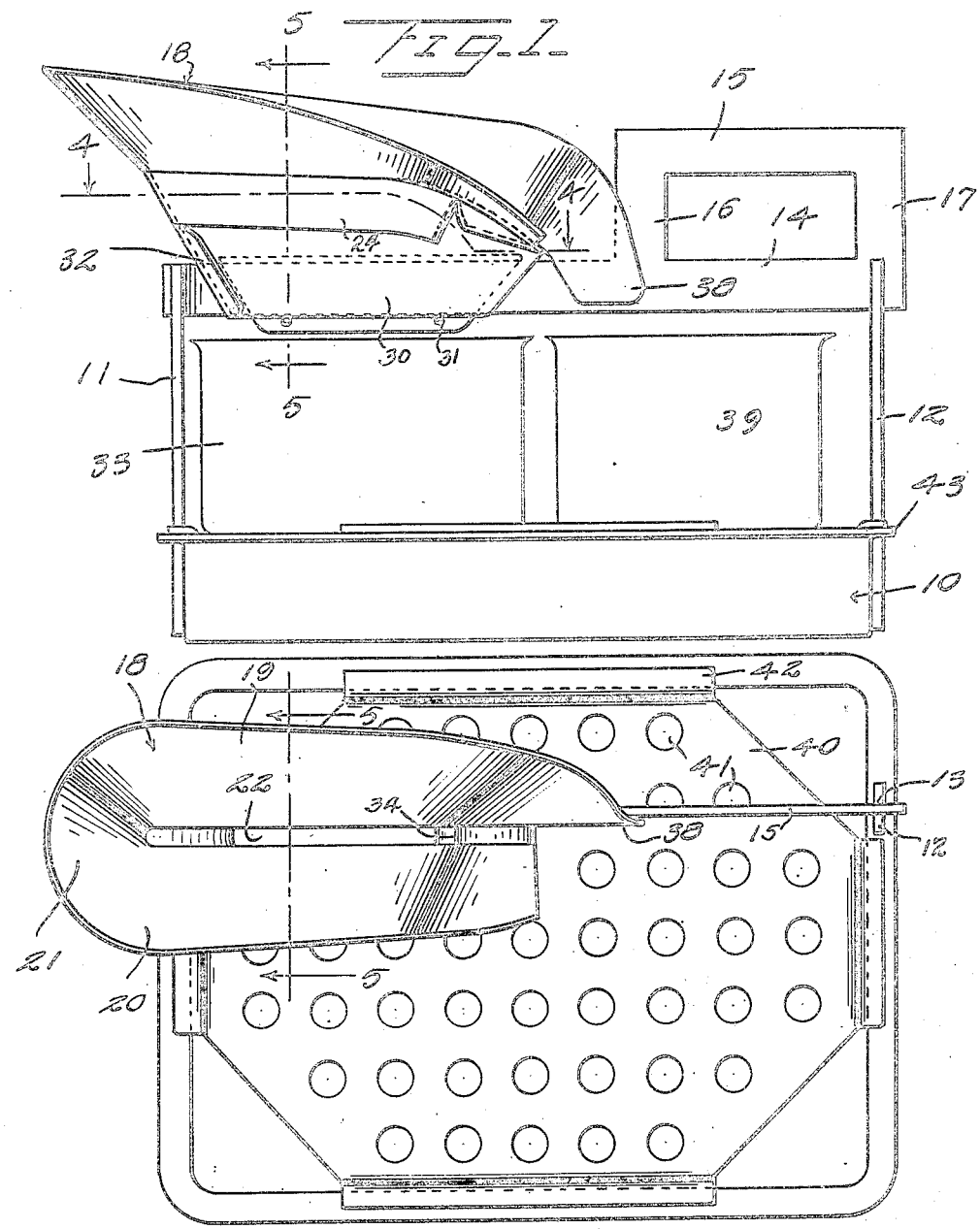

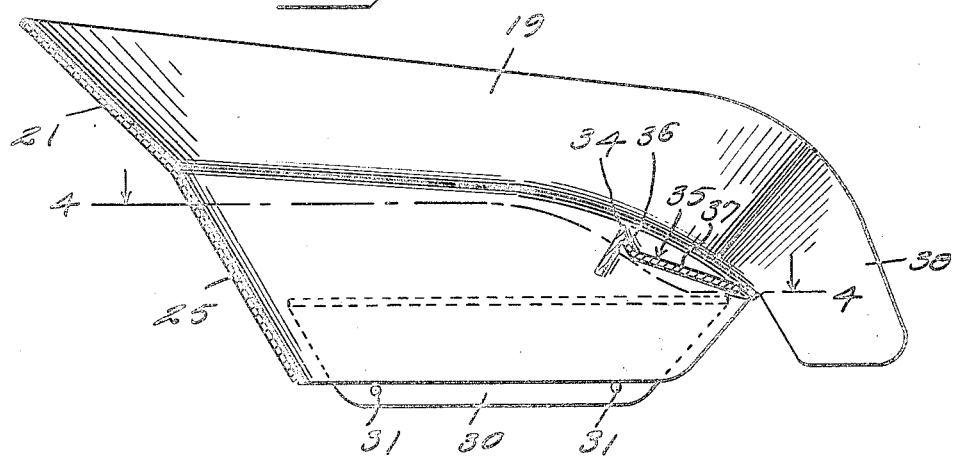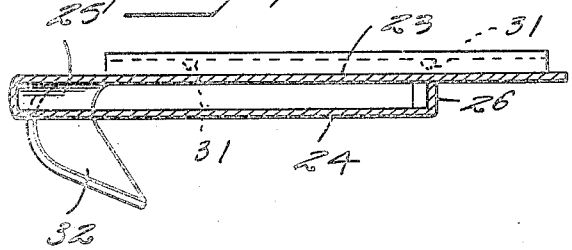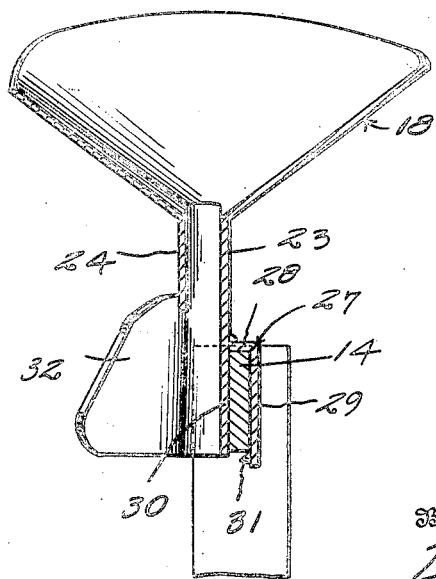

2,496,567

UNITED STATES PATENT OFFICE 2,496,567

EGG SEPARATOR

Edward C. Thorpe and William C. Shiew,
Dodge City, Kans.

Application June 11, 1945, Serial No. 598,852

1 Claim. (Cl. 146—2)

This invention relates to egg separators.

An object of this invention is to provide an improved separator whereby the yolk is separated from the white or albumen of the egg, the device including a trough having a slotted bottom through which the white or albumen is adapted to pass and the trough being formed at its forward end with a nozzle or spout for discharging the yolk into a suitable receptacle.

A further object of this invention is to provide in a device of this kind a stationary blade or cutter which is positioned in the bottom of the trough so as to cut any white or albumen adhering to the yolk as the latter moves forwardly in the trough.

A further object of this invention is to provide a device of this kind including a supporting means for supporting the separator and also including a means whereby the egg shells may be cracked prior to the separation.

A further object of this invention is to provide a device of this kind which is simple in construction and which embodies no moving parts so that the device can be manufactured at small cost and will last indefinitely.

To the foregoing objects, and others which may hereinafter appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail side elevation of an egg separator constructed according to an embodiment of this invention, Figure 2 is a top plan view of the device, Figure 3 is a vertical section taken longitudinally through the device with the trough removed from the supporting rack, Figure 4 is a sectional view taken substantially on the lines 4—4 of either Figures 1 or 3, and Figure 5 is a sectional view taken on the lines 5—5 of either Figures 1 or 2.

Referring to the drawings, the numeral 10 designates generally a pan or tray which is substantially rectangular in plan. The pan or tray 10 has fixedly secured to the opposite ends thereof at one side of the longitudinal center a pair of upstanding bracket arms 11 and 12. The arms 11 and 12 are formed at their upper ends with upwardly opening slots 13 in which a horizontally disposed supporting bar 14 is adapted to removably engage. The bar 14 is provided adjacent one end thereof with an egg shell cracking bar 15 which is supported above the bar 14 by means of vertically disposed supporting members 16 and 17.

An egg separating member, as will be hereinafter described, is removably mounted on the horizontal supporting bar 14. The egg separating member comprises a trough, generally designated as 18, embodying downwardly and inwardly inclined opposite side walls 19 and 20. The walls 19 and 20 are connected together at one end thereof by an arcuate downwardly and inwardly inclined wall 21 and the side walls 19 and 20 are spaced apart at their inner lower edges to provide a passage 22 within which the white or albumen of the egg is adapted to pass. The trough 18 has secured to the lower inner edges of the side walls thereof a pair of vertically disposed channel forming walls 23 and 24. The walls 23 and 24 extend downwardly from the side walls 19 and 20 and are disposed in parallel relation and are connected together at their rear ends by a downwardly and inwardly inclined wall 25, which may be integral with the wall 21 and with the walls 23 and 24.

The opposite or forward ends of the parallel walls 22 and 23 are connected together by a downwardly and inwardly inclined wall 26. The two end walls 25 and 26 form a downwardly inclined passage or guide so that the white or albumen of the egg will readily drop into a receptacle 33 disposed below the mouth of the passage formed by the walls 23, 24, 25 and 26. The wall 23 is substantially longer than the wall 24 and has secured to the outer side thereof an L-shaped member 27. The L-shaped member 27 includes a horizontally disposed upper wall 28, which may be welded, soldered or otherwise firmly secured to the outer side of the wall 23, and also includes a vertically disposed side 29. The L-shaped member 27 forms with the extended lower portion 30 of the wall 23, a narrow channel within which the supporting bar 14 is adapted to removably engage. The vertical side 29 of the supporting member comprising the L-shaped member 27 extends slightly below the lower edge of the supporting bar 14 and is formed with one or more detents 31, so that the separator structure will be yieldably held on the supporting bar 14.

The side wall 24 at the rear or outer end portion thereof has extending therebelow an arcuate wing 32. This wing 32 provides a means whereby the downwardly moving albumen will be guided into the receptacle 33. The wing or guide member 32 is downwardly and inwardly inclined and extends laterally from the inner wall 24. The yolk of the egg in its movement along the trough 18, which is inclined to the horizontal as shown in Figure 3, is adapted to be cut from any adhering white or albumen by means of a cutting blade 34. The cutting blade 34 extends across the channel 22 at the forward end portion of this channel and is positioned inwardly from the end wall 26. The blade 34 at its upper end is disposed at substantially the bottom of the trough 18 and the blade 34 has extending forwardly therefrom a narrow wall 35. The wall 35 includes a downwardly and forwardly inclined portion 36 extending from the blade 34 and also includes a downwardly and forwardly inclined portion 37 extending from the forward end of the wall portion 36 and forming an obtuse angle with respect thereto. The side wall 20 of the trough terminates at the forward end of the wall 35 but the side wall 19 is formed with a downwardly curved lip or extension 38 which extends downwardly from the trough proper and is adapted to guide the separated yolk into a receptacle 39.

The tray 10 has mounted on the upper edge thereof a receptacle supporting plate 40, which is of substantially hexagonal configuration in plan, and is provided with a plurality of openings 41. The receptacles 33 and 39 are adapted to rest on the supporting plate 40. The plate 40 is supported above the bottom of the tray 10 by means of oppositely disposed pairs of supporting tongues 42 which extend from opposite parallel edges of the plate and engage over the flange or rim 43 of the tray 10.

In the use and operation of this separator, the egg shell may be cracked on the bar 15 and the egg then opened and dropped into the trough 18. The trough 18 being inclined to the horizontal will cause the egg to move downwardly and forwardly. The egg white or albumen will flow downwardly into the passage 22 and will then drop into the receptacle 33. The guiding lip 32 will prevent any of the white or albumen from dropping downwardly outside of the receptacle 33. As the yolk, with any adhering white or albumen moves forwardly in the trough 18, the white will separate therefrom and at the time the yolk is disposed over the blade 34, this blade will sever any depending white or albumen which is clinging to the yolk so that the latter may freely move forwardly and downwardly for discharge into the yolk receptacle 39.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claim.

What we claim is:

In combination a tray, a pair of upstanding arms carried by said tray, a horizontal bar carried by said arms, a channel member formed of downwardly convergent opposite sides, a closed end and an open end, the convergent lower edges of said sides being spaced apart, a downwardly tapering tubular guide carried by said channel member and extending from the convergent edges of the sides thereof, an L-shaped bar engaging member carried by one side of said tubular member, and detents carried by said L-shaped member for releasably securing said L-shaped member on said bar.

EDWARD C. THORPE.
WILLIAM C. SHIEW.

REFERENCES CITED

The following references are of record in the file of this patent:

UNITED STATES PATENTS

| Number | Name | Date |
| --- | --- | --- |
| 1,030,346 | Svensson et al. | June 25, 1912 |
| 1,476,249 | Hall | Dec. 4, 1923 |
| 1,729,067 | Dow | Sept. 24, 1929 |
| 1,846,754 | Regensburger | Feb. 23, 1932 |
| 1,878,294 | Regensburger | Sept. 20, 1932 |
| 1,934,915 | DeVout et al. | Nov. 14, 1933 |
| 2,382,737 | Mink | Aug. 14, 1945 |